May 8, 1956  A. J. BACKMAN  2,744,782

OVERHEAD READ DOOR AND DOOR LOCKING MEANS FOR A PICK-UP TRUCK

Filed July 19, 1955  2 Sheets-Sheet 1

INVENTOR.
Arne J. Backman
BY
Fred C. Matheny
ATTORNEY

May 8, 1956     A. J. BACKMAN     2,744,782
OVERHEAD READ DOOR AND DOOR LOCKING MEANS FOR A PICK-UP TRUCK
Filed July 19, 1955     2 Sheets-Sheet 2
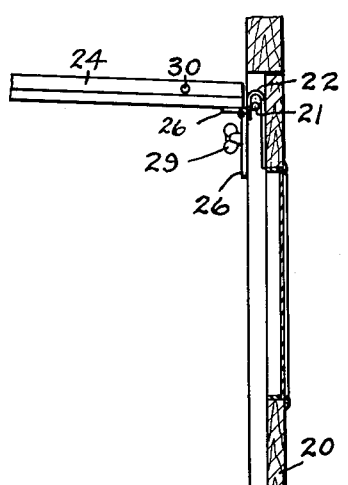
Fig. 3
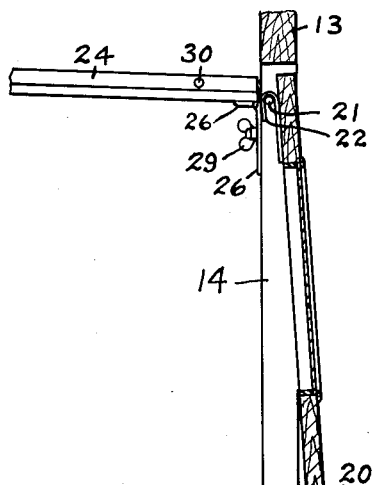
Fig. 4
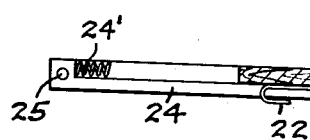
Fig. 5
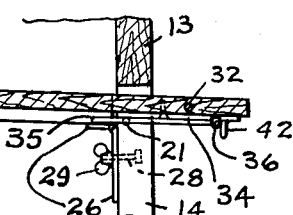
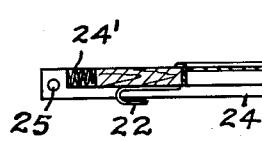
Fig. 6
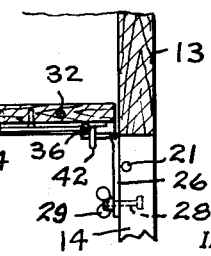
INVENTOR.
Arne J. Backman
BY Fred C Matheny
ATTORNEY

United States Patent Office 2,744,782
Patented May 8, 1956

2,744,782

OVERHEAD REAR DOOR AND DOOR LOCKING MEANS FOR A PICK-UP TRUCK

Arne J. Backman, Rochester, Wash.

Application July 19, 1955, Serial No. 522,959

7 Claims. (Cl. 296—50)

This invention relates to an overhead type back door and door and tail gate locking means for a pick-up truck.

An object of this invention is to provide a back door for the canopy of a pick-up truck in which the door is hinged from its top edge and can be raised into an approximately horizontal position and pushed into the truck canopy where it is out of sight and out of the way and completely clear of the back door opening in the canopy but is always carried with the truck and ready for use.

Another object is to provide overhead door means of this nature including pivotally mounted door supporting tracks which can be lowered at their rear ends to receive or release a door and can be raised at their rear ends when a door is positioned thereon to support said door in an out of the way and out of sight position.

Another object is to provide an overhead door of this nature having door locking means which will lock the door and the tail gate of the truck in a closed position in one operation of the locking means and which will not leave any obstructions protruding from the truck or door and which can be locked from the inside of the truck canopy in such a manner that it can not be opened from the outside of the truck.

Other objects of this invention will be apparent from the following description taken in connection with the accompanying drawings.

In the drawings Figure 1 is a rear elevation of the body part of a pick-up truck having an overhead door and door fastening means constructed in accordance with my invention, the door and the tail gate of the truck being shown closed and locked.

Fig. 3 is a vertical sectional view through the door and a portion of the canopy and tail gate, taken substantially on broken line 3—3 of Fig. 1 and showing the door and tail gate closed and locked from the outside.

Fig. 4 is a sectional view similar to Fig. 3 showing the door unlocked and swung outwardly a short distance preparatory to opening said door and placing it in an overhead out of the way position in the upper part of the truck canopy.

Fig. 5 is a sectional view showing the door raised and partly within the truck canopy and resting on door supporting tracks.

Fig. 6 is a sectional view similar to Fig. 5 showing the door in an overhead position entirely within the canopy and resting on the door supporting tracks and showing the rear end of a door supporting track in a raised position supporting the door in an out of the way and out of sight position and completely clear of the door opening in the canopy.

Figure 1:
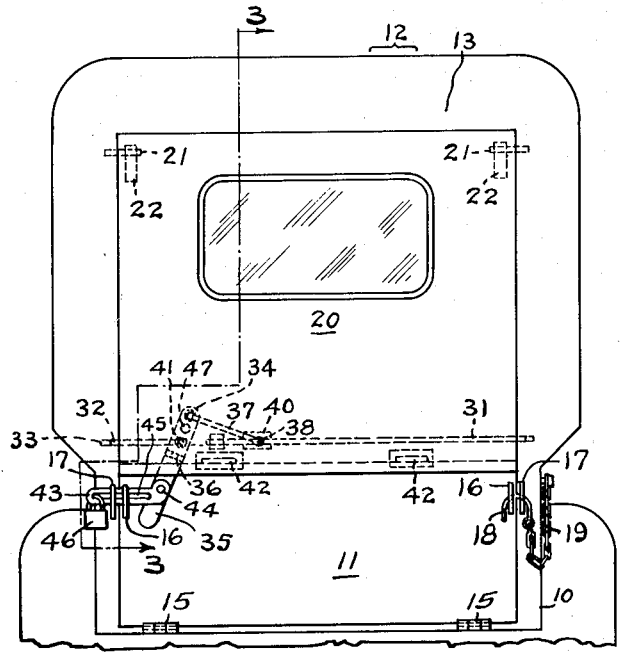

In the drawings 10 indicates the body or box part of a pick-up truck, 11 the downwardly opening tail gate of said truck body and 12 the usual canopy or enclosure, the canopy having a back wall 13 provided with a rectangular door opening 14. Hinges 15 support the tail gate 11 for downward swinging movement and slotted latch plates 16 on the opposite end portions of said tail gate register with other slotted latch plates 17 on the body 10 and are adapted to receive tail gate holding means. The tail gate holding means may be a captive hook 18 connected by a chain 19 with the truck body 10, as shown at the right in Fig. 1. If desired a similar hook and chain may be provided at the other side of the truck.

All of the above described parts are of well known conventional construction.

The door opening 14 in the back wall 13 of the canopy 12 is adapted to be closed by an upwardly opening door 20. Preferably the door 20 and canopy 12 are both constructed of waterproof plywood covered with sheet aluminum.

The door 20 is hinged at its upper edge by hinge means which mounts the door so that it may be swung outwardly at the bottom and then upwardly and then pushed into the canopy. The hinge means comprises two hinge pins 21 rigid with the back wall 13 and protruding into the door opening 14 near the uppermost corners of said opening and arranged to be engaged by two downwardly curved open hooks 22 which are secured to the inner side of the door 20 near the uppermost corners of said door. The hooks 22 hook over the pins 21 and support and pivotally mount the door 20 and are releasable from the pins 21 when the door is swingingly moved outwardly and upwardly far enough so that the top of the door will clear the part of the back wall 13 at the top of the opening 14. Also these hooks 22 are self engaging and will hook over the pins 21 when the door 20 is pulled rearwardly out of the canopy 12.

Figure 2:
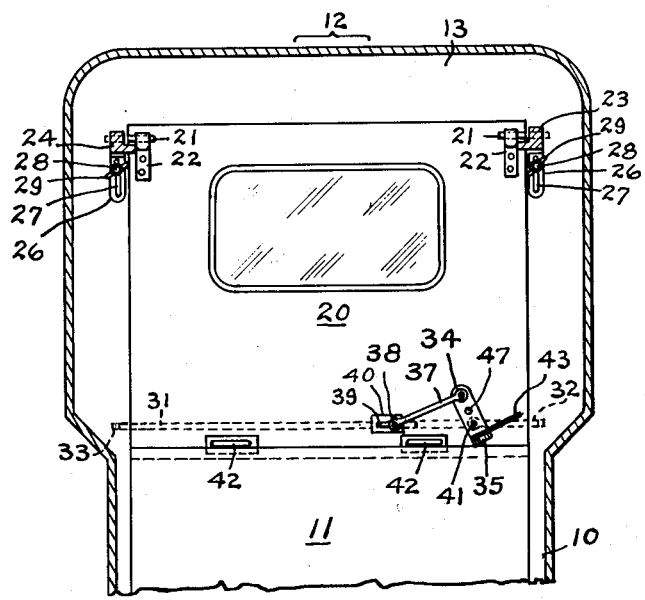
Fig. 2 is a view similar to Fig. 1 but taken from the inside of the truck with the back door and tail gate closed and locked and showing door supporting tracks and a part of the truck canopy in section.

Two door receiving tracks 23 and 24, Fig. 2, of L-shaped cross section and of duplicate construction, except that they are right and left, are mounted within the canopy 12 to receive and support the door 20. The forward end of each door track, an illustration of which is the end of the door track 24 shown at the left in Figs. 5 and 6, is supported by a pivot member 25 from the adjacent side of the canopy 12. The other or rear end of each door track is supported for vertical adjustment near the upper end of the door opening 14. The means for adjustably supporting the rear end of each track 23 and 24 comprises a hinge member 26 having an upright slot 27 fitting over a stud bolt 28. Each stud bolt 28 is rigid with the back wall 13 and protrudes into the canopy 12 and is provided with a wing nut 29 to securely clamp the bracket.

The upper part of each hinge member 26 is attached to the rear end portion of the adjacent door track so that the hinge will firmly support the door track and prevent sidewise displacement of said door track and will allow the required vertical adjustment of the door track. A hole 30 is provided in the upright flange of each door track 23 and 24 to cooperate in holding the door 20, as hereinafter explained. A compression spring 24' is provided at the forward end of each track member 23 and 24 for the adjacent end of the door 20 to abut against. One of these springs 24' is shown in Figs. 5 and 6. These springs 24' cooperate in holding the door firmly and in preventing it from rattling.

The lower end portion of the door 20 is provided with locking and holding means which cooperates with the tail gate 11 in locking and holding both the door 20 and tail gate 11 in closed positions. This locking and holding means comprises two aligned cross bolts 31 and 32 longitudinally slidably mounted in or on the door 20 a short distance upwardly from the bottom edge thereof and arranged to be projected outwardly from the lateral edges of said door into holes 33, Fig. 4, in the back wall 13. A bolt handle formed of an upper part 34 and a lower part 35 connected together by a hinge 36, is provided for moving the bolts 31 and 32. The upper end portion of the upper bolt handle part 34 is connected by a link 37 with a pin 38 which is rigid with the bolt 31. Endwise movement of the pin 38 may be limited by engagement of the ends of said pin with a slot 39 in a plate 40 which is secured to the door 20. Another pin 41 connects said handle part 34 directly with the bolt 32. Preferably the handle part 34 is fulcrumed on the door 20 by a pivot 47. However, this pivot 47 may be dispensed with and the handle part 34 will still operate the bolts 31 and 32. If the pivot 47 is used then the pin 41 may operate in a short slot in the handle part 34. Angular movement of the handle part 34 will move both bolts 31 and 32 either into a retracted position or into an outwardly projected locking position in which they are in the holes 33 when the door is closed.

Preferably two hand hold members 42 are provided on the inner side of the door 20 a short distance upwardly from the bottom edge of said door. When the door is closed these hand hold members rest on the top edge 11a of the tail gate 11, as shown in Fig. 3, and hold the door up so that the top edge of said door is substantially against the back member 13. In opening the door said door will move down, as shown in Fig. 4 enough to allow the top edge of the door to clear the adjacent part of the back wall 13 as said door is swingingly moved upwardly toward a horizontal position.

A flat hasp member 43 is swingingly connected by a pivot 44 with the lower part 35 of the bolt handle and is provided with a longitudinal slot 45. When the door 20 is closed the lower end of said door overlaps and extends below the top edge of the tail gate and holds the tail gate closed. The bolt handle 34—35 is mounted on the inner side of the door and, except when the door is locked from the inside, the handle part 35 and hasp 36 will usually extend downwardly between the tail gate and the door, as shown in Figs. 1 and 3. In locking the door and the tail gate from the outside the handle 34—35 is swingingly moved to retract the bolts 31 and 32, the hasp is held in alignment with the slots in two adjacent latch plates 16 and 17 and the handle 34—35 is swingingly moved to simultaneously move the bolts 31 and 32 into locking positions and to project the hasp 43 through registering slots in the latch plates 16 and 17. A padlock 46 is then locked into the slot 45 of the hasp 43 outwardly from the latch plates thus securely locking both the door 20 and tail gate 11 so they can not be opened either from the inside or the outside until after the padlock 46 is removed.

If the door 20 and tail gate 11 are to be locked from the inside of the canopy the door 20 is swung outwardly at the bottom, the handle part 35 is pivoted inwardly on the hinge 36 and the door is closed with the handle part 35 extending over the top part 11a of the tail gate 11 and into the enclosed part of the truck. With the door 20 closed and the lower end of the same overlapping the upper end of the tail gate 11 the handle 34—35 is angularly moved to project the bolts 31 and 32 outwardly into the holes 33 in locking positions. When thus locked from the inside the door 20 and tail gate 11 can not be opened from the outside and the truck can safely be used for sleeping purposes or for any other uses for which locking from the inside is desirable.

When the door 20 is open and stored by positioning it on the track members 23 and 24 the bolts 31 and 32 will be projected into the holes 30 in said tracks and the pressure of the springs 24' will be against these bolts rather than against the rear wall 13. This will prevent the bolts from jarring out of the holes 30 and all parts of the door will be prevented from rattling.

The foregoing description and accompanying drawings clearly disclose a preferred embodiment of my invention but it will be understood that changes may be made within the scope of the following claims.

I claim:

1. In door means, a canopy having a back wall provided with a rectangular door opening; two parallel spaced apart door tracks disposed within the canopy and positioned substantially perpendicular to the back wall and near the top of the door opening and approximately flush with the respective sides of the door opening; pivot means remote from said back wall supporting the front ends of said door tracks; adjustable means adjacent said back wall supporting the rear ends of said door tracks providing selective positioning of said rear ends of said door tracks either in a door receiving position below the top edge of said door opening or a door retaining and storage position above the top edge of said door opening; and a door closing said door opening when in an upright position and movable onto said door tracks when the rear ends of said tracks are below the top edge of said door opening, said door being above the top edge of said door opening when the door is on the tracks and the rear ends of the tracks are in a raised position.

2. The apparatus as claimed in claim 1 in which the top edge portion of said door is pivotally connected with the back of the canopy by downwardly curved self engaging hooks providing movement into the canopy and onto the tracks of the door when the door is swingingly moved upwardly into an approximately horizontal position.

3. The apparatus as claimed in claim 1 in which the lower end portion of the door is provided with transversely movable bolts and the tracks are provided with recesses receiving said bolts when the door is on the tracks and in which springs are carried by the tracks and exert a resilient pressure against the upper end of the door when the door is on the tracks and the bolts are engaged within the recesses.

4. In closure means for a door opening in the rear end of a closed type vehicle body, a tail gate hinged at its bottom edge to said vehicle body; a back door hinged at its top edge to said vehicle body and overlapping the top edge of the tail gate when both the tail gate and the door are closed; bolts carried by the door movable into locking engagement with the vehicle body; and a folding bolt operating handle on the inner side of the door connected with the bolts and swingingly movable in operating the bolts, a foldable part of said handle extending between the tail gate and the door to a position below the bottom edge of the door in providing locking of the door and tail gate from the exterior of the vehicle body and said foldable handle part pivoting and extending inwardly into the vehicle body above the top edge of the tail gate in providing locking of the door and tail gate from the inside of the vehicle body.

5. Door means for use with a closed type vehicle body having a canopy and having a rear wall provided with a rectangular opening extending from the bottom of the vehicle body to a location near the top of the canopy and having a hinged downwardly opening tail gate closing the lower portion of said opening when the tail gate is in an upright position leaving a back doorway in the canopy above the tail gate; a back door hinged to the canopy adjacent the top of said doorway closing the doorway and overlapping and holding the tail gate when the tail gate is closed; bolts carried by and extending crosswise of the bottom end portion of said door and movable longitudinally into locking engagement with said canopy; a two piece bolt operating handle positioned on the inner side of said door connected with said bolts and swingingly movable in operating said bolts; and a hinge connecting the two parts of said handle and positioned above the bottom end of the door, the lower part of the handle extending downwardly between the tail gate and the door and protruding below the bottom end of the door in providing locking of the door and the tail gate from the exterior of the canopy and said lower handle part pivoting on said hinge and extending into the canopy above the top edge of the tail gate and providing locking of the door and tail gate from the inside of the canopy.

6. The apparatus as claimed in claim 5 in which two slotted latch plates are secured respectively to the tail gate and the vehicle body and are positioned side by side with their slots in registration when the tail gate is closed; and in which a padlock receiving hasp member is pivotally attached to the lower part of the handle and extends through the slots in the two latch plates whereby the handle may be locked by a padlock in locking said door and said tail gate closed when the handle is outside of the tail gate.

7. In door means, a canopy having a back wall provided with a rectangular door opening, the walls defining the sides of said door opening having two opposed bolt receiving recesses near the lower end of the door opening; two parallel spaced apart door tracks disposed within the canopy approximately perpendicular to the back wall and near the respective uppermost corners of the door opening; said door tracks having two opposed bolt receiving recesses adjacent said back wall; pivots supporting the end portions of said tracks remote from the back wall; adjustable means supporting the rear ends of said tracks near the back wall providing selective positioning of the rear ends of said tracks below and above the top of said door opening; a door closing said door opening when in an upright position and swingingly movable onto said tracks when the rear ends of said tracks are below the top edge of said door opening; and longitudinally movable bolts carried by the lower end portion of said door locking into the bolt receiving recesses in the walls at the sides of the door opening when the door is in closing relation to the door opening and locking into the bolt receiving recesses in the tracks when the door is supported on the tracks.

References Cited in the file of this patent

UNITED STATES PATENTS

| 765,118 | Woeber | July 12, 1904 |
| 797,031 | Vivian | Aug. 15, 1905 |

FOREIGN PATENTS

| 642,053 | Great Britain | Aug. 23, 1950 |